Figure 1:
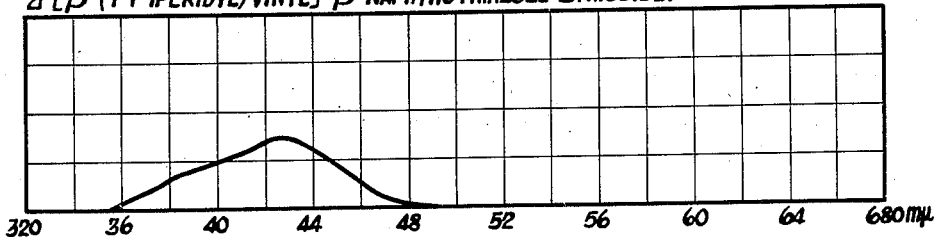

2-[β-(1-PIPERIDYL)VINYL]-β-NAPHTHOTHIAZOLE ETHIODIDE.

1-(4-DIETHYLAMINO-Δ$^{1,3}$-BUTADIENYL)-BENZOSELENAZOLE ETHIODIDE.

1-(4-DIETHYLAMINO-Δ$^{1,3}$-BUTADIENYL)-BENZOTHIAZOLE ETHIODIDE.

2-[4-DI(TETRAHYDROFURFURYLAMINO)-Δ$^{1,3}$-BUTADIENYL]-β-NAPHTHOTHIAZOLE ETHIODIDE.

Frank L. White & Grafton H. Keyes, INVENTORS;
BY N. M. Perrins
Daniel J. Mayne
ATTORNEYS.

July 18, 1939.  F. L. WHITE ET AL  2,166,736
PHOTOGRAPHIC EMULSION
Filed April 23, 1937   2 Sheets-Sheet 2

1-[4-(1-Piperidyl)-Δ$^{1,3}$-Butadienyl]-Benzoxazole Ethiodide.

2-[4-(1-Piperidyl)-Δ$^{1,3}$-Butadienyl]-Quinoline Ethiodide.

1-[4-(4-Morpholyl)-Δ$^{1,3}$-Butadienyl]-Benzothiazole Ethiodide.

1-[6-(1-Piperidyl)-Δ$^{1,3,5}$-Hexatrienyl]-Benzothazole Ethiodide.

Frank L. White & Grafton H. Keyes,
INVENTORS:
BY N. M. Perrins
Daniel I. Mayne
ATTORNEYS.

Patented July 18, 1939

2,166,736

UNITED STATES PATENT OFFICE 2,166,736

PHOTOGRAPHIC EMULSION

Frank L. White and Grafton H. Keyes, Rochester, N. Y., assignors to Eastman Kodak Company, Rochester, N. Y., a corporation of New Jersey Application April 23, 1937, Serial No. 138,634

19 Claims. (Cl. 95—7)

This invention relates to new dyes and to photographic emulsions containing the same.

Certain known dyes of the cyanine class are known to alter the sensitivity of photographic emulsions. Now, we have found an entirely new class of dyes and that these new dyes alter the sensitivity of photographic emulsions particularly silver halide emulsions, in a new and useful manner.

An object of our invention, therefore, is to provide new dyes and a process for the preparation thereof. A further object is to provide photographic emulsions sensitized with such dyes. A still further object is to provide a photographic element comprising a support coated with such sensitized emulsion. Other more specific objects will become apparent hereinafter.

The dyes of our invention can be illustrated by the following general formulas:

Ia. 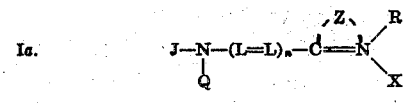

and

Ib. 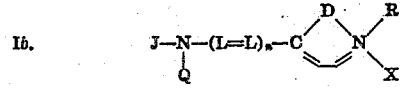

wherein D represents vinylene or phenylene groups, L represents a methenyl group, $n$ represents a positive integer not greater than three, J represents hydrogen or an aliphatic group while Q represents an aliphatic group and J and Q together represent the non-metallic atoms necessary to complete a basic cyclic organic nucleus other than a pyrrol nucleus, R represents an alkyl group, X represents an acid radical and Z represents the non-metallic atoms necessary to complete an organic heterocyclic nucleus. The term "aliphatic group", is intended to include saturated as well as unsaturated aliphatic groups and to include also substituted aliphatic groups such as benzyl, β-hydroxyethyl or the like.

More particularly in Formulas Ia and Ib, J and Q can each represent an alkyl group, such as methyl, ethyl, n-butyl, allyl, benzyl, β-hydroxyethyl, furylmethyl (furfuryl) or the like and J and and Q together can represent the non-metallic atoms necessary to complete an organic cyclic basic nucleus, such as piperidine, a tetrahydroquinoline, a N-alkylpiperazine, a piperazine, a morpholine or like nucleus. Z can represent the non-metallic atoms necessary to complete a five-membered heterocyclic nucleus, such as a thiazole nucleus, for example benzothiazole, 4-chlorobenzothiazole, 5-methylbenzothiazole, 4-methylthiazole, naphthothiazoles, 4-phenylthiazole, 4,5-diphenylthiazole or the like, an oxazole nucleus, for example benzoxazole, naphthoxazoles, 4-methyloxazole, 4-phenyloxazole or the like, a selenazole nucleus, for example benzoselenazole, a selenazole, 4-methylselenazole or 4-phenylselenazole, a 3,3-dialkylindolenine nucleus, for example 3,3-dimethylindoline; a thiazoline nucleus, a selenazoline nucleus, or the like, and Z can represent the non-metallic atoms necessary to complete a six-membered heterocyclic nucleus, such as a pyridine nucleus, a quinoline nucleus, for example 5-methylquinoline or benzoquinoline, or the like. X can represent halide, alkylsulfate, perchlorate, nitrate, p-toluenesulfonate or the like. R can represent alkyl groups such as methyl, ethyl, n-butyl, benzyl, allyl or the like.

Our new dyes can be prepared by reacting a basic primary or secondary non-aromatic amine, particular a monoamine, with a compound of one of the following formulas:

IIa. 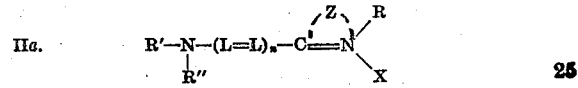

and

IIb. 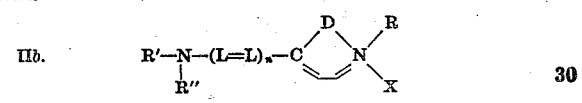

wherein D represents a vinylene or phenylene group, $n$ represents a positive integer not greater than three, R' represents an acyl group, R'' represents an aryl group, R, X and Z have the values indicated above under Formulas Ia and Ib. More particularly in Formulas IIa and IIb, R' can represent an acyl group, such as acetyl, propionyl, butyryl, benzoyl or the like and R'' can represent an aryl group, such as phenyl, naphthyl, xylyl, diphenyl or the like, i. e., an aryl group containing not more than twelve nuclear carbon atoms, for example.

The basic non-aromatic primary or secondary amines are advantageously reacted with the compounds of Formulas IIa or IIb in the presence of a diluent, such as a lower aliphatic alcohol, i. e., one of four carbon atoms or less. However, the diluent is not essential. Other diluents, such as ethylidene dichloride, ethylene dichloride or dioxane, can be used. The diluent should be inert toward the dyes and so chosen that the formed dye will separate therefrom at least upon cooling. Heat accelerates the formation of our new dyes. The non-aromatic primary or secondary amine is advantageously employed in molecular excess; from 1.5 to 3 molecular proportions (mol.) per molecular proportion of compound of Formulas IIa and IIb is suitable. With a molecular ratio of 1:1 the yield of our new dyes is generally lower than when an excess is employed.

Compounds of Formulas IIa and IIb can be prepared by reacting a cyclammonium quaternary salt containing a reactive alkyl group in the alpha or gamma position, i. e., one of the so-called relative positions, with a compound of the following formula:

III. 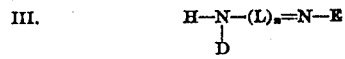

wherein L represents a methenyl group, $n$ represents a positive odd integer not greater than five, D and E represent aryl groups, such as phenyl, naphthyl, xylyl or the like. Some of the compounds represented by Formula III are basic and form salts with acids, such as hydrochloric, sulfuric and the like acids. These salts can be used as well to react with the above mentioned cyclammonium salts. Examples of compounds of Formula III and their salts which can advantageously be employed are: diphenylformamidine, $\beta$-anilinoacrolein anil, $\beta$-anilino-$\alpha$-bromoacrolein anil, $\beta$-anilino-$\alpha$-chloroacrolein anil and their hydrochlorides, glutaconic aldehyde dianilide hydrochloride, $\alpha$-($\beta$-naphthylimino-$\epsilon$-($\beta$-naphthylamino)-$\alpha$-methyl-$\alpha,\gamma$pentadiene hydrochloride (see König, Journal für praktische Chemie, vol. 69, page 136), etc. The compounds of Formula III can be reacted with cyclammonium quaternary salts containing a reactive alkyl group by mere heating of the reactants together, advantageously in the presence of acetic anhydride or the like. The cyclammonium quaternary salts which can be employed are those corresponding to the heterocyclic nuclei pointed out above under Formulas Ia and Ib, i. e., for example, quaternary salts of 1-methylbenzothiazole, 1-ethylbenzothiazole, $\mu$-methylnaphthothiazoles, quinaldine, $\alpha$- and $\gamma$-picolines, lepidine, 1-methylbenzoxazole, $\mu$-methylnaphthoxazoles, 1-methylbenzoselenazole, 2,4-dimethylthiazole, 2-methyl-4-phenylthiazole, 2,3,3-trimethylindolenine, 2-methylthiazoline and the like.

The basic primary or secondary non-aromatic amines which can be reacted with compounds of Formulas IIa and IIb, are, for example, aliphatic amines for instance monoalkylamines, such as methylamine, ethylamine, n-butylamine sec-butylamine, isopropylamine, n-decylamines, cyclohexylamine, furfurylamine, tetrahydrofurfurylamine, $\beta$-hydroxyethyl amine, allylamine, benzylamine or the like or dialkylamines, such as dimethylamine, diethylamine, di-n-butylamine, di-sec-butylamine, di-isopropylamine, di-n-decylamines, difurfurylamine, di-$\beta$-hydroxyethylamine, dibenzylamine or the like or secondary basic heterocyclic amines such as five-membered basic heterocyclic amines, for example, pyrrolidines or the like or six-membered basic heterocyclic amines, for example piperidine, morpholine, 1,2,3,4-tetrahydroquinolines, piperazine, N-alkylpiperazines or the like. Pyrrol cannot be used in our process.

Reaction products of compounds of Formula III with such cyclammonium quaternary salts prepared in the presence of acetic anhydride or the like are the acylated compounds of Formulas IIa and IIb. When prepared in the absence of acetic anhydride or the like the reaction products must be acylated by treatment with acylating agents, such as acid anhydrides or acid chlorides; e. g. acetic, propionic or benzoic anhydrides. We have found the acetylated compounds are particularly useful in preparing our new dyes.

The following procedures will serve to illustrate the manner of obtaining compounds of Formulas IIa and IIb.

2-($\beta$-acetanilidovinyl)-quinoline ethiodide can be prepared by heating, at about 180° C. for about 10 minutes with stirring, 60 g. (1 mol.) of quinaldine ethiodide and 40 g. (1 mol.) of diphenylformamidine. The cooled reaction mixture is advantageously ground with acetone, and then filtered and dried. 20 g. (1 mol.) of this acetone-treated reaction product was refluxed in about 50 cc. of acetic anhydride for about 10 minutes. The reaction mixture was chilled and the 2-($\beta$-acetanilidovinyl)-quinoline ethiodide which separated was filtered off and washed with acetone.

2-($\beta$-acetanilidovinyl)-thiazoline methiodide can be prepared by heating, at about 100° C for about 15 minutes, an intimately ground mixture of 159 g. (1 mol.) of 2-methylthiazoline methiodide and 135 g. (1.05 mol.) of diphenylformamidine in about 220 cc. of glacial acetic acid. The reaction product separated from the cooled reaction mixture. It was refluxed, for about 15 minutes in sufficient acetic anhydride to form a solution. One molecular proportion of pyridine for each molecular proportion of reaction product is advantageously employed in the solution during refluxing. The 2-($\beta$-acetanilidovinyl)-thiazoline methiodide was precipitated from solution by adding diethyl ether. The precipitated tarry mass was stirred with acetone until crystalline.

1-($\beta$-acetanilidovinyl)-benzothiazol ethiodide can be prepared by refluxing, for about 20 minutes, 48 g. (1 mol.) of diphenylformamidine and 67 g. (1 mol.) of 1-methylbenzothiazole ethiodide in about 365 cc. of acetic anhydride. The 1-($\beta$-acetanilidovinyl)-benzothiazole ethiodide separated from the chilled reaction mixture and was washed with acetone and dried.

1-($\beta$-acetanilidovinyl)-benzoxazole ethiodide can be prepared by refluxing, for about 20 minutes, 40 g. (1 mol.) of diphenylformamidine and 58 g. (1 mol.) of 1-methylbenzoxazole ethiodide in about 250 cc. of acetic anhydride. The 1-($\beta$-acetanilidovinyl)-benzoxazole ethiodide separated from the chilled reaction mixture and was washed with acetone and dried.

4-($\beta$-acetanilidovinyl)-quinoline ethiodide can be prepared by heating, at 150° C. to 160° C. with stirring, an intimate mixture of 29.9 g. (1 mol.) of lepidine ethiodide and 19.6 g. (1 mol.) of diphenylformamidine for about 10 minutes. The cooled reaction mass was stirred with acetone and the acetone-treated reaction product then refluxed in sufficient acetic anhydride to form a solution, for about 15 minutes. One molecular proportion of pyridine for each molecular proportion of reaction product is advantageously employed in the solution during refluxing. The 4-($\beta$-acetanilidovinyl)-quinoline ethiodide was precipitated from solution by adding diethyl ether. The precipitated product was stirred with acetone and dried.

1-(4-acetanilido-$\Delta^{1,3}$-butadienyl)-benzothiazole ethiodide can be prepared by refluxing, for about one hour, 30.5 g. (1 mol.) of 1-methylbenzothiazole ethiodide and 25.9 g. (1 mol.) of $\beta$-anilinoacrolein anil hydrochloride in about 250 cc. of acetic anhydride. The 1-(4-acetanilido) compound separated from the chilled reaction mixture. It was filtered, washed with acetone and dried.

2 - (4 - acetanilido - Δ¹,³-butadienyl) - quinoline ethiodide can be prepared by refluxing, for about one hour, 3 g. (1 mol.) quinaldine ethiodide and 2.5 g. (1 mol.) of β-anilinoacrolein anil hydrochloride in about 20 cc. of acetic anhydride. The reaction mixture was chilled and the acetanilido compound precipitated by adding two volumes (about 40 cc.) of diethyl ether. The acetanilido compound was washed with water and acetone.

1 - (4-acetanilido-Δ¹,³-butadienyl) -benzoxazole ethiodide can be prepared by refluxing, for about one hour, 2.9 g. (1 mol.) of 1-methylbenzoxazole ethiodide and 2.5 g. (1 mol.) of β-anilinoacrolein anil hydrochloride in about 20 cc. of acetic anhydride. The reaction mixture was chilled and the acetanilido compound precipitated with two volumes (about 40 cc.) of diethyl ether. The tarry precipitate was stirred with acetone until crystalline.

1 - (6-acetanilido-Δ¹,³,⁵-hexatrienyl) - benzoxazole ethiodide can be prepared by refluxing, for about 5 minutes, 5.5 g. (1 mol.) of glutaconic aldehyde dianilide hydrochloride and 5.8 g. (1 mol.) of 1-methylbenzoxazole ethiodide in about 25 cc. of acetic anhydride. The reaction mixture was chilled and the acetanilido compound precipitated by adding diethyl ether. The precipitate was purified by stirring with acetone.

1 - (6-acetanilido-Δ¹,³,⁵-hexatrienyl) - α - naphthoxazole ethiodide can be prepared by refluxing, for about 5 minutes, 3.4 gr. (1 mol.) of 1-methyl-α naphthoxazole ethiodide and 2.8 g. (1 mol.) of glutaconic aldehyde dianilide hydrochloride in about 40 cc. of acetic anhydride. The acetanilido compound separated from the chilled reaction mixture. It was washed with acetone.

Still further illustrations of the preparation of these dye-intermediates will be found in the following examples.

Compounds of Formula III where n represents one can be prepared as described by Claisen in Annalen, vol. 287, page 366 (1895) and by Comstock & Wheeler in the American Chemical Journal, vol. 13, page 516 (1891) and by Dains in the Berichte der deutschen chemischen Gesellschaft, vol. 35, 2498-2501 (1902). Compounds of Formula III where n represents three can be prepared as described by Reitzenstein & Bönitsch in the Journal für praktische chemie, vol. 86, page 1 (1912) and by Dieckmann & Platz in the Berichte der deutschen chemischen Gasellschaft, vol. 37, pages 4635-4638 (1904). Compounds of Formula III wherein n represents five can be prepared as described by Zincke in Annalen, vol. 330, page 361 (1904) and by Zincke, Heuser & Möller in Annalen, vol. 333, page 296 (1904) and by Zincke & Würker in Annalen, vol. 338, page 107 (1905) and by König in Journal für praktische chemie, (2) vol. 69, page 129 and (2) vol. 70, pages 23 and 52.

By the term "non-aromatic amine," we mean an amine in which the amino group is not directly attached to a benzene or equivalent aromatic ring system as the amino group is in aniline, methylaniline, α- and β-naphthylamines, 1-aminoanthraquinone, α-aminopyridine, 5-aminoquinoline, or the like.

While the process of preparing our new dyes is subject to variation particularly as respects the nature and quantities of the reactants, the nature and quantity of the diluent and the temperatures, the following examples serve to illustrate the mode of practicing the preparation of our new dyes of Formulas IIa and IIb where n represents one. These examples are not intended to limit our invention.

*Example 1.* — 1-[β-(4-morpholyl)-vinyl]-benzoxazole ethiodide.

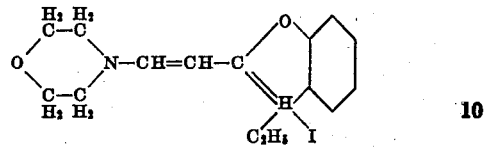

2.2 g. (1 mol.) of 1-(β-acetanilidovinyl)-benzoxazole ethiodide, 1.2 g. (3 mol.) of morpholine and 15 cc. of absolute ethyl alcohol were refluxed for about thirty minutes. The dye separated from the cooled reaction mixture and after twice recrystallizing from ethyl alcohol was obtained as pale yellow crystals melting at 211-213° C. Its ethyl alcoholic solution is colorless.

*Example 2.* — 1-[β-(1-piperidyl)-vinyl] - benzothiazole ethiodide.

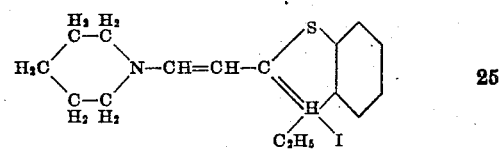

1.1 g. (1 mol.) of 1-(β-acetanilidovinyl)-benzothiazole ethiodide, 0.6 g. (3 mol.) of piperidine and 10 cc. of absolute ethyl alcohol were refluxed for about 30 minutes. The dye separated from the cooled reaction mixture and after twice recrystallizing from methyl alcohol was obtained as light yellow crystals melting at 274-277° C. with decomposition. Its methyl alcoholic solution was pale yellow.

*Example 3.* — 1-[β-(4-morpholyl)-vinyl]-benzothiazole ethiodide.

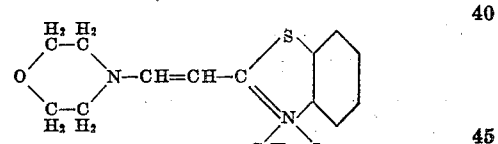

1.1 g. (1 mol.) of 1-(β-acetanilidovinyl)-benzothiazole ethiodide, 0.7 g. (3 mol.) of morpholine and 20 cc. of absolute ethyl alcohol were refluxed for about 30 minutes. The dye separated from the cooled reaction mixture and after twice recrystallizing from methyl alcohol was obtained as yellow crystals melting at 263-265° C. with decomposition. Its methyl alcoholic solution was pale yellow.

*Example 4.* — 2-[β-(1-piperidyl)-vinyl]-β-naphthothiazole ethiodide.

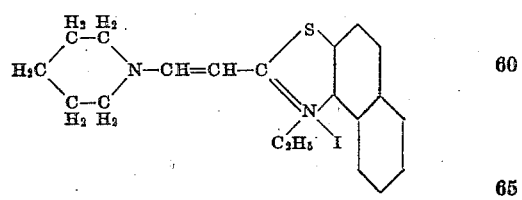

2.5 g. (1 mol.) of 2-(β-acetanilidovinyl)-β-naphthothiazole ethiodide, 1.2 g. (3 mol.) of piperidine and 25 cc. of absolute ethyl alcohol were refluxed for about 30 minutes. The dye separated from the cooled reaction mixture and after twice recrystallizing from methyl alcohol was obtained as brownish yellow crystals melting at 230-232° C. with decomposition. Its methyl alcoholic solution was pale yellow.

2-(β-acetanilidovinyl)-β-naphthothiazole ethiodide can be made by refluxing 3.5 g. (1 mol.) of 2-methyl-β-naphthothiazole ethiodide, 1.9 g. (1 mol.) of diphenylformamidine and 7 cc. of acetic anhydride for about 20 minutes. The reaction mixture was chilled and the solid product which separated was filtered, washed with water and acetone and dried. Upon recrystallization from acetic acid it melted at 180° C. with decomposition.

Example 5.—2-[β-(1-piperidyl)-vinyl]-quinoline ethiodide.

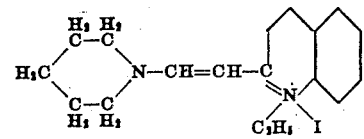

1.1 g. (1 mol.) of 2-(β-acetanilidovinyl)-quinoline ethiodide, 0.6 g. (3 mol.) of piperidine and 20 cc. of absolute ethyl alcohol were refluxed for about 30 minutes. The dye separated from the cooled reaction mixture and after twice recrystallizing from methyl alcohol was obtained as yellow crystals melting at 253–255° C. with decomposition. Its methyl alcoholic solution was yellow.

In the above five examples the piperidine and morpholine can be replaced with any basic non-aromatic primary or secondary amine such as pointed out above in connection with reaction with compounds of Formulas IIa and IIb. Likewise the 1-(β-acetanilidovinyl)-benzoxazole ethiodide, 1-(β-acetanilidovinyl)-benzothiazole ethiodide, 2-(β-acetanilidovinyl)-β-naphthothiazole ethiodide and 2-(β-acetanilidovinyl)-quinoline ethiodide can be replaced by other quaternary salts such as butiodides, alkyl sulfates, alkyl-p-toluenesulfonate or the like, as well as by acetanilidovinyl derivatives of cyclammonium alkyl quaternary salts of bases corresponding to the nuclei pointed out above under Formulas Ia and Ib.

The following examples serve to illustrate the mode of preparation of our new dyes of Formulas IIa and IIb where $n$ equals two. These examples are not intended to limit our invention.

Example 6.—1[4-(1-piperidyl)-$\Delta^{1,3}$-butadienyl]-benzothiazole ethiodide.

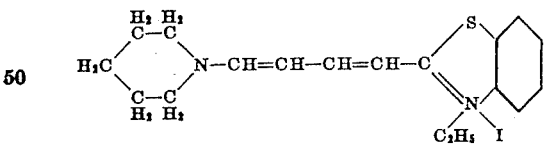

2.4 g. (1 mol.) of 1-(4-acetanilido-$\Delta^{1,3}$-butadienyl)-benzothiazole ethiodide, 1.2 g. (3 mol.) of piperidine and 25 cc. of absolute ethyl alcohol were refluxed for about 30 minutes. The dye separated from the cooled reaction mixture and after recrystallizing from methyl alcohol was obtained as minute orange red crystals melting at 205–207° C. with decomposition. Its methyl alcoholic solution was deep yellow.

Example 7.—1-[4-(4-morpholyl)-$\Delta^{1,3}$-butadienyl]-benzothiazole ethiodide.

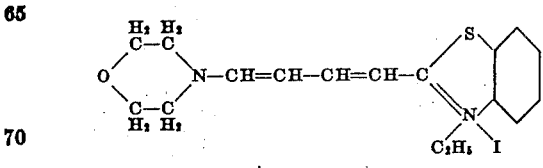

1.2 g. (1 mol.) of 1-(4-acetanilido-$\Delta^{1,3}$-butadienyl)-benzothiazole ethiodide, 0.7 g. (3 mol.) of morpholine and 20 cc. of absolute ethyl alcohol were refluxed for about 30 minutes. The dye separated from the cooled reaction mixture and after twice recrystallizing from methyl alcohol was obtained as minute reddish crystals melting at 248–251° C. with decomposition. Its methyl alcoholic solution was deep yellow.

Example 8.—1-(4-di-β-hydroxyethylamino-$\Delta^{1,3}$-butadienyl)-benzothiazole ethiodide.

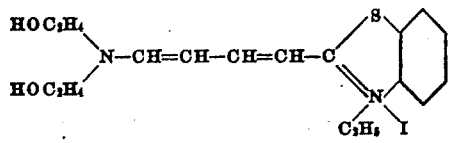

1.2 g. (1 mol.) of 1-(4-acetanilido-$\Delta^{1,3}$-butadienyl)-benzothiazole ethiodide, 0.8 g. (3 mol.) of diethanolamine and 20 cc. of absolute ethyl alcohol were refluxed for about 30 minutes. The dye separted from the cooled reaction mixture, and after two recrystallizations from methyl alcohol was obtained as bluish crystals melting at 210° to 212° C. with decomposition. Its methyl alcoholic solution was yellow.

Example 9.—1-(4-di-n-butylamino-$\Delta^{1,3}$-butadienyl)-benzothiazole ethiodide.

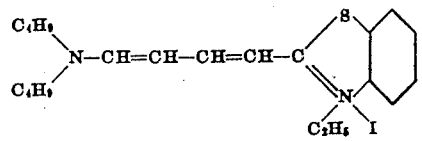

1.2 g. (1 mol.) of 1-(4-acetanilido-$\Delta^{1,3}$-butadienyl)-benzothiazole ethiodide, 0.9 g. of di-n-butylamine and 10 cc. of absolute ethyl alcohol were refluxed for about 30 minutes. The dye separated from the cooled reaction mixture and after two recrystallizations from ethyl acetate was obtained as reddish crystals with a blue reflex and melting at 150° to 152° C. with decomposition. Its ethyl acetate solution was golden yellow.

Example 10.—1-(4-diethylamino-$\Delta^{1,3}$-butadienyl)-benzothiazole ethiodide.

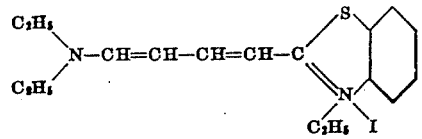

1.2 g. (1 mol.) of 1-(4-acetanilido-$\Delta^{1,3}$-butadienyl)-benzothiazole ethiodide, 0.6 g. (3 mol.) of diethylamine and 15 cc. of absolute ethyl alcohol were refluxed for 30 minutes. The dye separated from the cooled reaction mixture and was twice recrystallized from acetone. The dye was obtained as minute reddish needles melting at 209° to 211° C. with decomposition. The dye gave a deep yellow solution in acetone.

Example 11.—1-(4-dibenzylamino-$\Delta^{1,3}$-butadienyl)-benzothiazole ethiodide.

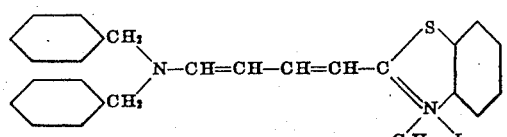

1.2 g. (1 mol.) of 1-(4-acetanilido-$\Delta^{1,3}$-butadienyl)-benzothiazole ethiodide, 1.0 g. (2 mol.) of dibenzylamine and 10 cc. of absolute ethyl alcohol were refluxed for about 30 minutes. The dye separated from the cooled reaction mixture and after two recrystallizations from methyl alcohol was obtained as minute orange crystals melting at 221° to 223° C. with decomposition. Its methyl alcoholic solution was a deep yellow.

*Example 12.*—1 - (4 - diallylamino-Δ¹,³-butadienyl)-benzothiazole ethiodide.

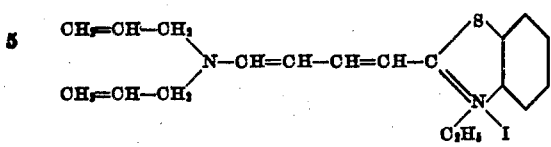

1.2 g. (1 mol.) of 1-(4-acetanilido-Δ¹,³-butadienyl)-benzothiazole ethiodide, 0.75 g. (3 mol.) of diallylamine and 15 cc. of absolute ethyl alcohol were refluxed for about 30 minutes. The dye separated from the cooled reaction mixture and after successive recrystallizations from methyl alcohol and then ethyl acetate was obtained as dull reddish crystals melting at 164° to 166° C. with decomposition. Its ethyl acetate solution was a deep yellow.

1 - (4-acetanilido-Δ¹,³-butadienyl) -benzoxazole ethiodide can be prepared by refluxing 2.9 g. (1 mol.) of 1-methylbenzoxazole ethiodide, 2.5 g. (1 mol.) of β-anilinoacrolein anilhydrochloride and 30 cc. of acetic anhydride for about 60 minutes. The reaction mixture was chilled and 50 cc. of diethyl ether added. The ether-mixture was allowed to stand 12 hours in an ice-box when a tarry precipitate formed. The ether was decanted and the residue stirred with acetone (100 cc.). The tarry mass dissolved and upon standing crystals separated. These crystals were filtered off, washed with acetone and dried.

*Example 13.*—1 - [4 - (1-piperidyl) -Δ¹,³-butadienyl]-benzoxazole ethiodide.

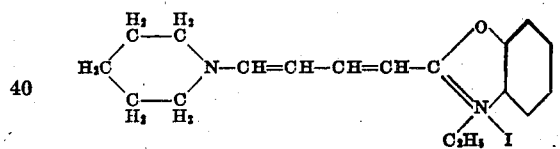

1.1 g. (1 mol.) of 1-(4-acetanilido-Δ¹,³-butadienyl)-benzoxazole ethiodide, 0.6 g. (3 mol.) of piperidine and 15 cc. of absolute ethyl alcohol were refluxed for about 30 minutes. The dye separated from the cooled reaction mixture and after two recrystallizations from ethyl alcohol was obtained as minute yellow crystals melting at 192° to 195° C. with decomposition. Its solution in ethyl alcohol was yellow.

*Example 14.*—1-[4-(6-methoxy-1-tetrahydroquinolyl) - Δ¹,³ - butadienyl] - benzothiazole ethiodide.

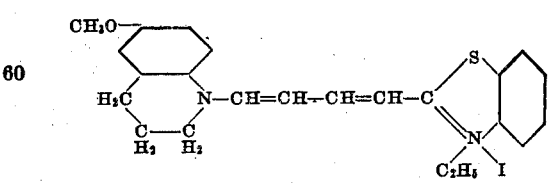

1.2 g. (1 mol.) of 1-(4-acetanilido-Δ¹,³-butadienyl)-benzothiazole ethiodide, 0.4 g. (1 mol.) of 1,2,3,4-tetrahydro-6-methoxy quinoline and 20 cc. of absolute ethyl alcohol were refluxed for about 30 minutes. The dye separated from the cooled reaction mixture and after two recrystallizations from methyl alcohol was obtained as minute greenish crystals melting at 252° to 254° C. with decomposition. Its methyl alcoholic solution was bluish red.

*Example 15.*—1-(4 - n - butylamino - Δ¹,³-butadienyl)-benzothiazole ethiodide.

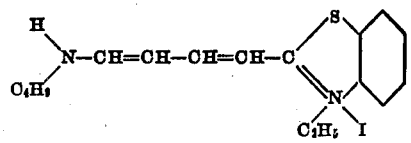

2.4 g. (1 mol.) of 1-(4-acetanilido-Δ¹,³-butadienyl)-benzothiazole ethiodide, 1.0 g. (3 mol.) of n-butylamine and 10 cc. of absolute ethyl alcohol were refluxed for about 30 minutes. The dye separated from the cooled reaction mixture and after two recrystallizations from methyl alcohol was obtained as minute brownish crystals melting at 174.5° to 176.5° C. with decomposition. Its methyl alcohol solution was brownish yellow.

*Example 16.*—1 - (4-di-tetrahydrofurfurylamino) -Δ¹,³-butadienyl)-benzothiazole ethoperchlorate.

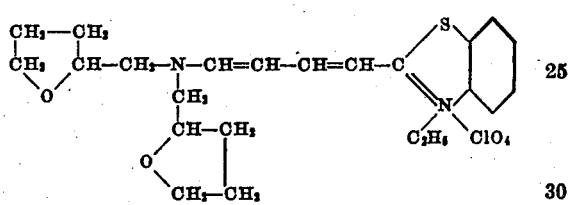

2.4 g. (1 mol.) of 1-(4-acetanilido-Δ¹,³-butadienyl)-benzothiazole ethiodide, 2.7 g. (3 mol.) of ditetrahydrofurfurylamine and 10 cc. of absolute ethyl alcohol were refluxed for about 30 minutes. The dye was precipitated by chilling the reaction mixture and adding thereto 20 cc. of ethyl acetate. The precipitated dye-iodide was dissolved in 10 cc. of methyl alcohol and 0.65 g. (1 mol. plus 10% excess) of sodium perchlorate. The dye-perchlorate precipitated. It was twice recrystallized from methyl alcohol and obtained as bright orange crystals melting at 202.5° to 204.5° C. with decomposition. Its methyl alcoholic solution was golden yellow.

*Example 17.*—2 - (4 - diethylamino-Δ¹,³-butadienyl)-β-naphthothiazole ethiodide.

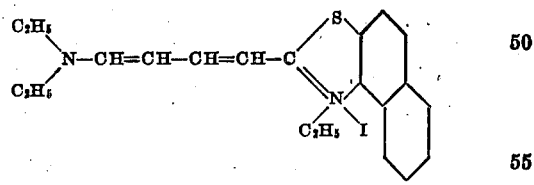

1.3 g. (1 mol.) of 2-(4-acetanilido-Δ¹,³-butadienyl)-β-naphthothiazole ethiodide, 0.6 g. (3 mol.) of diethylamine and 10 cc. of absolute ethyl alcohol were refluxed for about 30 minutes. The dye separated from the cooled reaction mixture and was recrystallized from 95% ethyl alcohol and obtained as dark greenish crystals melting at 205° to 208° C. with decomposition. Its ethyl alcoholic solution was pinkish orange.

2 - (4-acetanilido-Δ¹,³-butadienyl) -β-naphthothiazole ethiodide was prepared by refluxing 3.5 g. (1 mol.) of 2-methyl-β-naphthothiazole ethiodide, 2.5 g. (1 mol.) of β-anilinoacrolein anil hydrochloride and 20 cc. of acetic anhydride for about 60 minutes. The reaction mixture was chilled and the product precipitated by adding ether (60 cc.). The product was stirred with acetone, filtered, washed with acetone and dried.

*Example 18.*—2-(4-ditetrahydrofurfurylamino-Δ^{1,3}-butadienyl)-β-naphthothiazole ethiodide.

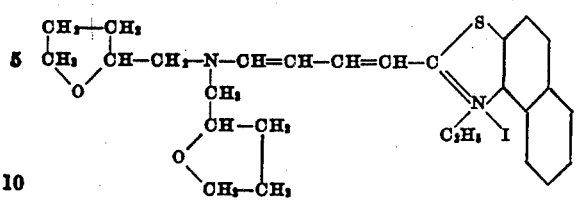

1.3 g. (1 mol.) of 2-(4-acetanilido-Δ^{1,3}-butadienyl)-β-naphthothiazole ethiodide, 1.35 g. (3 mol.) of ditetrahydrofurfurylamine and 10 cc. of absolute ethyl alcohol were refluxed for about 30 minutes. The dye separated from the cooled reaction mixture and after two recrystallizations from methyl alcohol was obtained as dark reddish purple crystals melting at 133.5° to 135.5° C. Its methyl alcoholic solution was pinkish.

*Example 19.*—2 - [4 - (1 - piperidyl) -Δ^{1,3}-butadienyl]-β-naphthothiazole ethiodide.

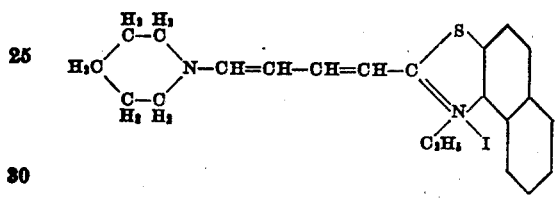

1.3 g. (1 mol.) of 2-(4-acetanilido-Δ^{1,3}-butadienyl)-β-naphthothiazole ethiodide, 0.6 g. (3 mol.) of piperidine and 10 cc. of absolute ethyl alcohol were refluxed for about 30 minutes. The dye separated from the cooled reaction mixture and after two recrystallizations from methyl alcohol was obtained as reddish crystals melting at 148° to 151° C. with decomposition. Its methyl alcoholic solution was purplish orange.

*Example 20.*—1 - (4 - diethylamino - Δ^{1,3}-butadienyl)-benzoselenazole ethiodide.

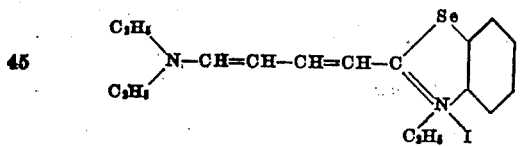

2.6 g. (1 mol.) of 1-(4-acetanilido-Δ^{1,3}-butadienyl)-benzoselenazole ethiodide, 0.6 g. (3 mol.) of diethylamine and 15 cc. of absolute ethyl alcohol were refluxed for about 30 minutes. The dye separated from the cooled reaction mixture and after two recrystallizations from acetone and one recrystallization from a solvent composed of one part by volume ethyl alcohol and three parts ethyl acetate, the dye was obtained as minute reddish crystals melting at 120° to 122° C. with decomposition. Its ethyl acetate-ethyl alcohol solution was a deep yellow.

1-(4 - acetanilido-Δ^{1,3}-butadienyl)-benzoselenazole ethiodide was prepared by refluxing 3.5 g. (1 mol.) of 1-methyl-benzoselenazole ethiodide, 2.5 g. (1 mol.) of β-anilinoacrolein anil hydrochloride and 20 cc. of acetic anhydride for about 45 minutes. The reaction mixture was chilled and the product precipitated by adding diethyl ether. The product was filtered and washed with acetone.

*Example 21.*—2 - [4 - (1 - piperidyl) -Δ^{1,3}-butadienyl]-quinoline ethiodide.

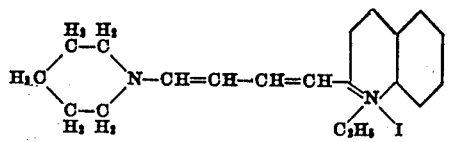

1.1 g. (1 mol.) of 2-(4-acetanilido-Δ^{1,3}-butadienyl)-quinoline ethiodide, 0.6 g. (3 mol.) of piperidine and 15 cc. of absolute ethyl alcohol were refluxed for about 30 minutes. The dye separated from the cooled reaction mixture and, after two recrystallizations from 95% ethyl alcohol, was obtained as minute reddish crystals melting at 237° to 239° C. with decomposition. Its ethyl alcoholic solution was pinkish orange.

*Example 22.*—4-[4 -(1 - piperidyl) - Δ^{1,3} - butadienyl]-quinoline ethiodide.

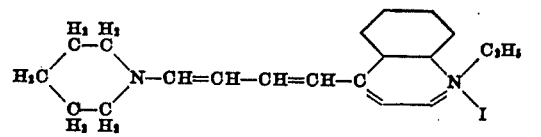

2.2 g. (1 mol.) of 4-(4-acetanilido-Δ^{1,3}-butadienyl)-quinoline ethiodide, 1.2 g. (3 mol.) of piperidine and 5 cc. of absolute ethyl alcohol were refluxed for about 30 minutes. The dye separated from the cooled reaction mixture and, after two recrystallizations from acetone, was obtained as minute greenish crystals melting at 204° to 206° C. with decomposition. Its ethyl alcoholic solution was bluish red.

4-(4 - acetanilido - Δ^{1,3} - butadienyl) -quinoline ethiodide was prepared by refluxing 6 g. (1 mol.) of lepidine ethiodide, 5 g. (1 mol.) of β-anilinoacrolein anil hydrochloride and 30 cc. of acetic anhydride for about 30 minutes. Reaction mixture was chilled and 100 cc. of diethyl ether added. Ether decanted and product stirred with acetone. Filtered, washed with acetone and dried.

*Example 23.*—1,4-di-[4-(1-benzothiazyl) - Δ^{1,3} - butadienyl] piperazine diethiodide.

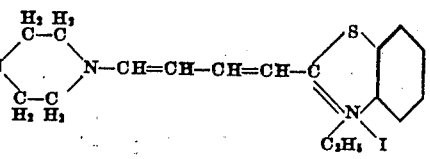

1.2 g. (2 mol.) of 1-(4-acetanilido-Δ^{1,3}-butadienyl) benzothiazole ethiodide, 0.25 g. (2 mol.) of piperazine hexahydrate and 20 cc. of absolute ethyl alcohol were refluxed for about 30 minutes. The dye separated from the cooled reaction mixture and after recrystallization from methyl alcohol was obtained as minute reddish crystals melting at 303° to 305° C. with decomposition. Its methyl alcoholic solution was pinkish orange.

*Example 24.*—1,4 - di -[4-(1 - benzoxazyl) -Δ^{1,3}-butadienyl] piperazine diethiodide 2.3 g. (2 mol.) of 1-(4-acetanilido-Δ^{1,3}-butadienyl) benzoxazole ethiodide, 0.5 g. (2 mol.) of piperazine hexahydrate and 30 cc. of absolute ethyl alcohol were refluxed for about 30 minutes. The dye separated from the cooled reaction mixture and after recrystallization twice from methyl alcohol was obtained as brownish orange crystals melting at 298° to 300° C. with decomposition. Its methyl alcoholic solution was deep yellow.

*Example 25.*—1,4-di-[4-(2-quinolyl)-Δ¹,³-butadienyl] piperazine diethiodide.

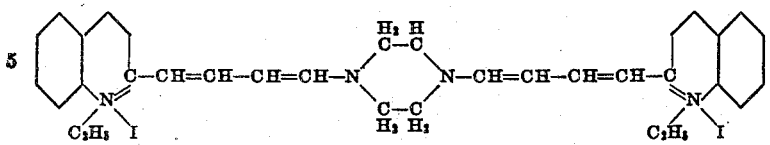

2.2 g. (2 mol.) of 2-(4-acetanilido-Δ¹,³-butadienyl) quinoline ethiodide, 0.5 g. (2 mol.) of piperazine hydrate and 20 cc. of absolute ethyl alcohol were refluxed for about 30 minutes. The dye separated from the cooled reaction mixture and was twice recrystallized from methyl alcohol and obtained as brownish purple crystals melting at 287° to 289° C. with decomposition. Its methyl alcoholic solution was deep crimson.

In the above twenty examples, the piperidine, morpholine, butylamine, diethylamine, diallylamine, dibutylamine, ditetrahydrofulfurylamine, dibenzylamine, piperazine and tetrahydroquinoline can be replaced with any basic non-aromatic primary or secondary amine such as pointed out above in connection with reaction with compounds of Formulas IIa and IIb. Likewise the acetanilido-Δ¹,³-butadienyl ethiodides can be replaced with other quarternary salts, e. g., butiodides, propobromides, alkylsulfates, alkyltoluenesulfonates or the like. Likewise acylanilido-Δ¹,³-butadienyl derivatives of 4-methylthiazole, 4-phenylthiazole, 4-methyloxazole, 4-phenyloxazole, 4,5-diphenylthiazole, 4-phenylselenazole, thiazoline, selenazoline, 3,3-dialkylindolenine or the like quaternary salts can be reacted with primary or secondary basic non-aromatic amines.

The following examples serve to illustrate the mode of preparation of our new dyes of Formulas IIa and IIb where *n* equals three. These examples are not intended to limit our invention.

*Example 26.*—1-[6-(1-piperidyl)-Δ¹,³,⁵-hexatrienyl]-benzothiazole ethiodide.

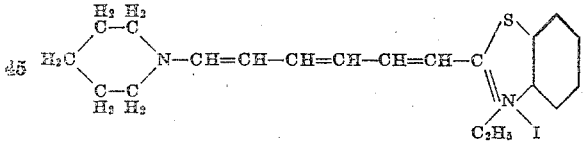

1.25 g. (1 mol.) of 1-(6-acetanilido-Δ¹,³,⁵-hexatrienyl)-benzothiazole ethiodide, 0.6 g. (3 mol.) of piperidine and 10 cc. of absolute ethyl alcohol were mixed and allowed to stand at room temperature (20° to 25° C.) for about 15 minutes. The dye separated and was filtered off and dissolved from the impurities by extraction with hot ethyl alcohol. It was recrystallized a second time from ethyl alcohol and obtained as dark blue crystals melting at 120.5° to 123.5° C. with decomposition. Its ethyl alcoholic solution was purple.

The 1-(6-acetanilido-Δ¹,³,⁵-hexatrienyl) benzothiazole ethiodide was prepared as follows: 12.2 g. (1 mol.) of 1-methyl-benzothiazole ethiodide, 11.4 g. (1 mol.) of glutaconic aldehyde dianilide hydrochloride and 50 cc. of acetic anhydride were heated to refluxing for about 10 minutes. The product was washed with water and used without further purification.

*Example 27.*—1-[6-(4-morpholyl)-Δ¹,³,⁵-hexatrienyl]-benzothiazole ethiodide.

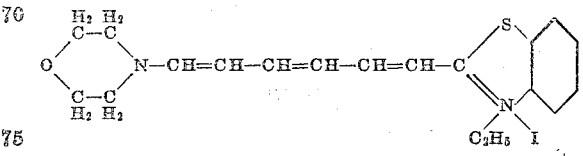

1.25 g. (1 mol.) of 1-(6-acetanilido-Δ¹,³,⁵-hexatrienyl)-benzothiazole ethiodide, 0.7 g. (3 mol.) of morpholine and 15 cc. of absolute ethyl alcohol were mixed and allowed to stand at 20° to 25° C. for about ten minutes. The dye separated and was dissolved from the impurities by extraction with hot methyl alcohol. After a second recrystallization from methyl alcohol, the dye was obtained as dark blue crystals melting at 154.5° to 156.5° C. with decomposition. Its methyl alcoholic solution was purple.

In the above two examples the piperdine and morpholine can be replaced by any basic non-aromatic primary or secondary amine such as pointed out above in connection with reaction with compounds of Formulas IIa and IIb. Likewise the acetanilido-Δ¹,³,⁵-hexatrienyl ethiodides can be replaced with other quaternary salts, e. g., butiodides, propobromides, alkylsulfates, alkyltoluenesulfonates or the like. Likewise acylanilido derivatives of other quaternary salts such as pointed out above in Formulas IIa and IIb can be reacted with primary or secondary non-aromatic basic amines.

We have found it advantageous to obtain our new dyes in the form of the dye-iodides in most instances. The dye-iodides are also a satisfactory form of our new dyes to employ in preparing sensitized photographic emulsions, we have found. However, the dye-iodides can be converted into other dye-salts. For instance, in Example 16, the dye-iodide was converted into the less soluble dye-perchlorate by treatment with sodium perchlorate. Our dye-iodides can be converted into dye-chlorides by dissolving the dye-iodides in methyl alcohol or other suitable solvent, adding an excess of freshly prepared silver chloride to the solution and refluxing the mixture for several hours. The silver iodide formed is filtered off and the resulting solution concentrated and chilled to precipitate the dye-chloride.

In the above examples heating under reflux is intended to mean heating the reaction mixture to moderate boiling under reflux.

Still further examples of the preparation of our new dyes could be cited but the foregoing will be sufficient to teach those skilled in the art the manner of obtaining our new dyes.

Our new dyes, particularly those where *n* represents one or two, can be employed in manufacturing light filters and to color cellulose acetate yarn, i. e. cellulose acetate silk.

Our new dyes can be called hemicyanine dyes. Those containing a chain of two methenyl groups (where *n* in Formulas Ia and Ib represents one) can be called hemicarbocyanine dyes; those containing a chain of four methenyl groups (where *n* represents two) can be called hemidicarbocyanine dyes; and those containing a chain of six methenyl groups (where *n* represents three) can be called hemitricarbocyanine dyes.

Our new hemicyanine dyes give rise to photographic emulsions possessing novel sensitivity, when incorporated therein. Our invention is particularly directed to the customarily employed gelatino-silver-halide emulsions. However, our new hemicyanine dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light sensitive. By way of illustration the hereindescribed sensitized photographic emulsions were prepared employing ordinary gelatino-silver-chloride and gelatino-silver-bromide emulsions. Our hemicarbocyanine dyes (where n represents one) are advantageously employed with silver chloride emulsions. Our hemidicarbocyanine dyes are likewise advantageously employed with silver chloride emulsions.

In the preparation of photographic emulsions containing our new dyes, it is only necessary to disperse the dyes in the emulsions. The methods of incorporating dyes in emulsions are simple and well known to those skilled in the art. In practicing our invention, it is convenient to add the dyes from solutions in appropriate solvents. The solvent must, of course, be compatible with the emulsion, substantially free from any deleterious effect on the light-sensitive materials and capable of dissolving the dyes. Methanol has proven satisfactory as a solvent for our new dyes. The dyes are advantageously incorporated in the finished, washed emulsion and should be uniformly distributed throughout to secure best results.

The concentration of our new dyes in the emulsions can vary widely, e. g. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogenously dispersed. With the more powerful of our new sensitizing hemicyanine dyes, 10 to 20 mg. of dye per 1000 cc. of emulsion suffice to produce the maximum sensitizing effect with the ordinary gelatino-silver-halide emulsions.

The above statements are only illustrative and not to be understood as limiting our invention in any sense, as it will be apparent that our dyes can be incorporated by other methods in many of the photographic emulsions customarily employed in the art, such, for instance; as by bathing the plate or film upon which the emulsion has been coated, in a solution of the dye in an appropriate solvent, although such a method is ordinarily not to be preferred. The claims are intended to cover any combination of these new dyes with a photographic silver halide emulsion whereby the dye exerts a sensitizing effect upon the emulsions as well as a photographic element comprising a support, ordinarily transparent, upon which the light-sensitive emulsion is coated or spread and allowed to dry.

Figure 2:
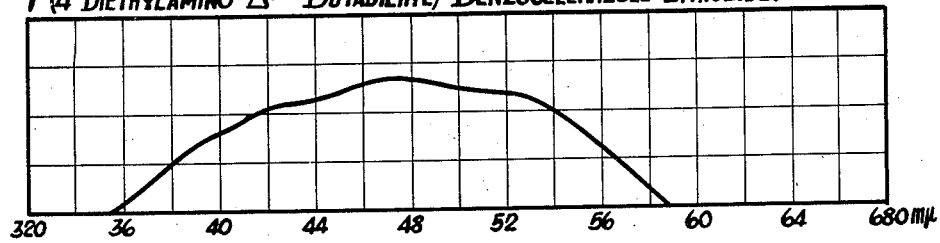
Figure 3:
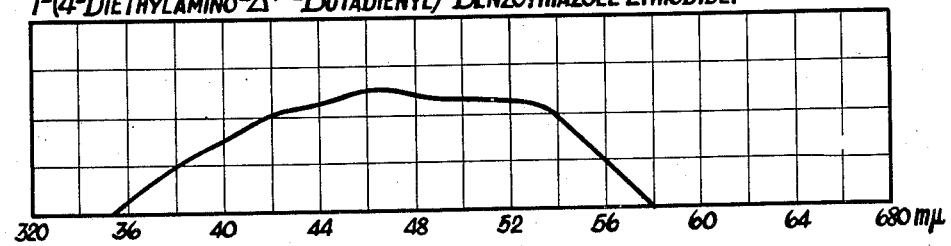
Figure 4:
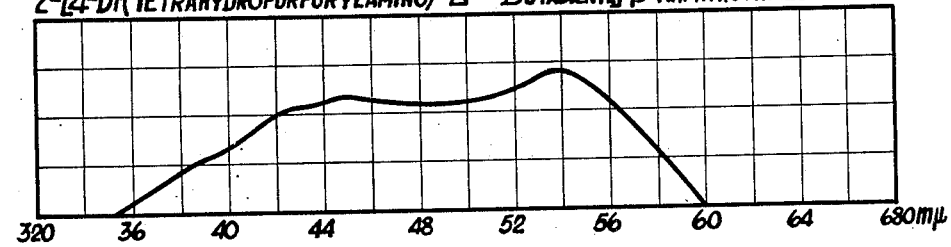
Figure 5:
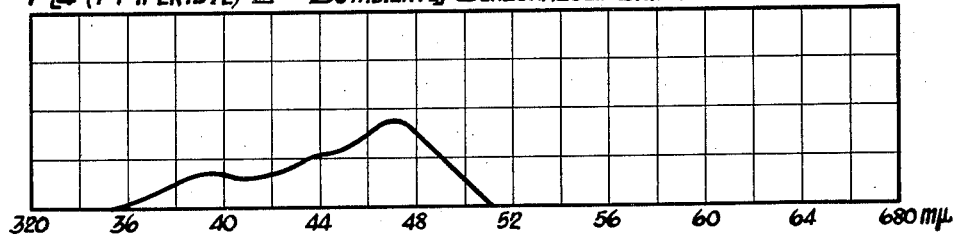
Figure 6:
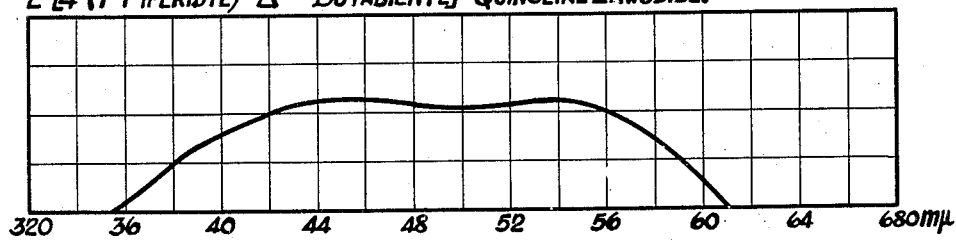
Figure 7:
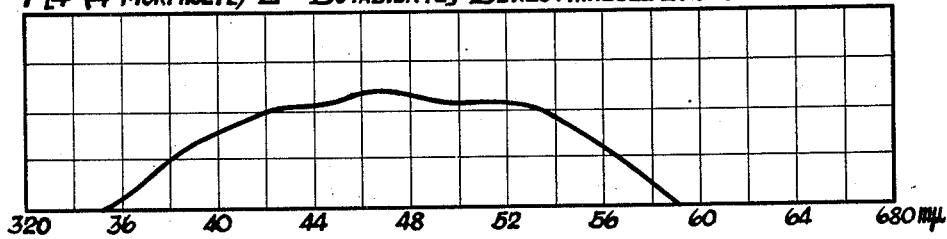
Figure 8:
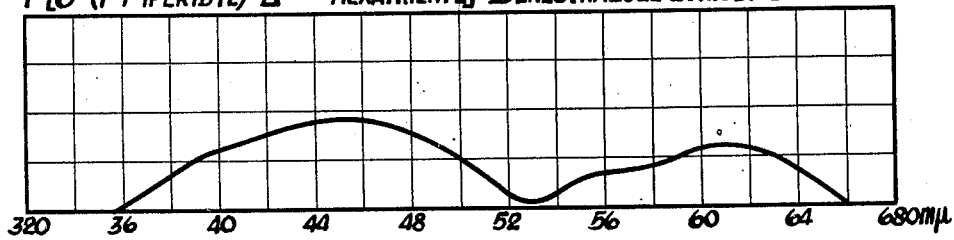

The accompanying drawings are by way of illustration and depict the sensitivity of emulsions containing eight of our new dyes. Each figure in the drawings is a diagrammatic reproduction of a spectrogram showing the sensitivity of silver chloride or silver bromide emulsions containing one of our new dyes. In Fig. 1, the sensitivity of an ordinary gelatino-silver-chloride emulsion containing 2-[β-1-(piperidyl)vinyl]-β-naphthothiazole ethiodide is depicted. In Fig. 2, the sensitivity of an ordinary gelatino-silver-bromide emulsion containing 1-(4-diethylamino-$\Delta^{1,3}$-butadienyl)-benzoselenazole ethiodide is depicted. In Fig. 3, the sensitivity of an ordinary gelatino-silver-bromide emulsion containing 1-(4-diethylamino-$\Delta^{1,3}$-butadienyl)-benzothiazole ethiodide is depicted. In Fig. 4, the sensitivity of an ordinary gelatino-silver-bromide emulsion containing 2-[4-di-(tetrahydrofurfuryl-amino)-$\Delta^{1,3}$-butadienyl]-β-naphthothiazole ethiodide is depicted. In Fig. 5, the sensitivity of an ordinary gelatino-silver-chloride emulsion containing 1-[4-(1-piperidyl)-$\Delta^{1,3}$-butadienyl]-benzoxazole ethiodide is depicted. In Fig. 6, the sensitivity of an ordinary gelatino-silver-bromide emulsion containing 2-[4-(1-piperidyl)-$\Delta^{1,3}$-butadienyl]-quinoline ethiodide is depicted. In Fig. 7, the sensitivity of an ordinary gelatino-silver-bromide emulsion containing 1-[4-(4-morpholyl)-$\Delta^{1,3}$-butadienyl]-benzothiazole ethiodide is depicted. In Fig. 8, the sensitivity of an ordinary gelatino-silver-bromide emulsion containing 1-[6-(1-piperidyl)-$\Delta^{1,3,5}$-hexatrienyl]-benzothiazole ethiodide is depicted.

We have found that those of our new hemicyanine dyes which contain an ethyl group and a halide radical attached to the quinquevalent nitrogen atom are especially good sensitizers of photographic emulsions, particularly gelatino-silver-halide emulsions.

Still further examples illustrating our invention could be cited, but the foregoing will be sufficient to teach those skilled in the art the manner in which our invention is carried out and the principles of sensitizing photographic emulsions with our new dyes.

What we claim as our invention and desire to be secured by Letters Patent of the United States is:

1. A photographic silver halide emulsion sensitized with a sensitizing dye selected from the group of dyes characterized by one of the following formulas:

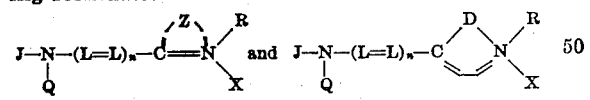

wherein D represents a divalent group selected from the group consisting of vinylene and phenylene groups, L represents a methenyl group, n represents a positive integer not greater than three, J represents a group selected from the group consisting of hydrogen and alkyl groups while Q represents an alkyl group and J and Q together represent the non-metallic atoms necessary to complete an organic basic cyclic nucleus other than a pyrrol nucleus, R represents an alkyl group, X represents an acid radical and Z represents the non-metallic atoms necessary to complete an organic heterocyclic nucleus.

2. A photographic gelatino-silver-halide emulsion sensitized with a sensitizing dye selected from the group of dyes characterized by one of the following formulas:

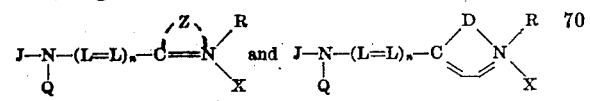

wherein D represents a divalent group selected from the group consisting of vinylene and phenylene groups, L represents a methenyl group, n represents a positive integer not greater than three, J represents a group selected from the group consisting of hydrogen and alkyl groups while Q represents an alkyl group and J and Q together represent the non-metallic atoms necessary to complete an organic basic cyclic nucleus other than a pyrrol nucleus, R represents an alkyl group, X represents an acid radical and Z represents the non-metallic atoms necessary to complete an organic heterocyclic nucleus.

3. A photographic gelatino-silver-halide emulsion sensitized with a sensitizing dye selected from the group of dyes characterized by one of the following formulas:

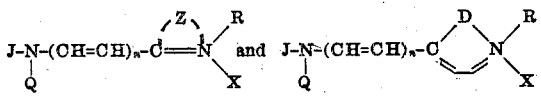

wherein D represents a divalent group selected from the group consisting of vinylene and phenylene groups, n represents a positive integer not greater than three, J represents a monovalent group selected from the group consisting of hydrogen and alkyl groups while Q represents an alkyl group and J and Q together represent the non-metallic atoms necessary to complete an organic cyclic basic nucleus other than a pyrrol nucleus and selected from the group consisting of five-membered and six-membered organic cyclic basic nuclei, R represents an alkyl group, X represents an acid radical and Z represents the non-metallic atoms necessary to complete an organic heterocyclic nucleus selected from the group consisting of five-membered and six-membered organic heterocyclic nuclei.

4. A photographic gelatino-silver-halide emulsion sensitized with a sensitizing dye selected from the group of dyes characterized by the following formula:

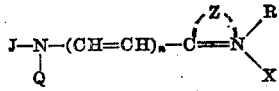

wherein n represents a positive integer not greater than 3, J represents a monovalent group selected from the group consisting of hydrogen and alkyl groups while Q represents an alkyl group, and J and Q together represent the non-metallic atoms necessary to complete an organic cyclic basic nucleus other than a pyrrol nucleus and selected from the group consisting of five-membered and six-membered organic cyclic basic nuclei, R represents an alkyl group, X represents an acid radical and Z represents the non-metallic atoms necessary to complete an organic heterocyclic nucleus selected from the group consisting of five-membered and six-membered organic heterocyclic nuclei.

5. A photographic gelatino-silver-halide emulsion sensitized with a sensitizing dye selected from the group of dyes characterized by the following formula:

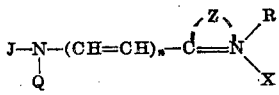

wherein n represents a positive integer not greater than 3, J represents a monovalent group selected from the group consisting of hydrogen and alkyl groups while Q represents an alkyl group, and J and Q together represent the non-metallic atoms necessary to complete an organic cyclic basic nucleus other than a pyrrol nucleus and selected from the group consisting of five-membered and six-membered organic cyclic basic nuclei, R represents an alkyl group, X represents an acid radical and Z represents the non-metallic atoms necessary to complete an azole nucleus.

6. A photographic gelatino-silver-halide emulsion sensitized with a sensitizing dye selected from the group of dyes characterized by the following formula:

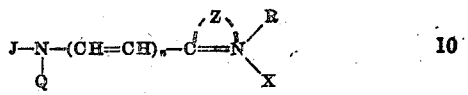

wherein n represents a positive integer not greater than three, J and Q together represent the non-metallic atoms necessary to complete a six-membered basic organic cyclic nucleus, R represents an alkyl group, X represents an acid radical and Z represents the non-metallic atoms necessary to complete an organic heterocyclic nucleus selected from the group consisting of five-membered and six-membered organic heterocyclic nuclei.

7. A photographic gelatino-silver-halide emulsion sensitized with a sensitizing dye selected from the group of dyes characterized by the following formula:

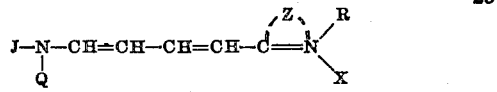

wherein J and Q together represent the non-metallic atoms necessary to complete a six-membered organic basic cyclic nucleus, R represents an alkyl group, X represents an acid radical and Z represents the non-metallic atoms necessary to complete a benzothiazole nucleus.

8. A photographic gelatino-silver-halide emulsion sensitized with a sensitizing dye selected from the group of dyes characterized by the following formula:

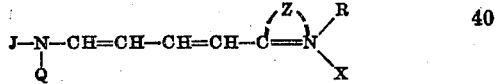

wherein J and Q together represent the non-metallic atoms necessary to complete a six-membered organic basic cyclic nucleus, R represents an alkyl group, X represents an acid radical and Z represents the non-metallic atoms necessary to complete a naphthothiazole nucleus.

9. A photographic gelatino-silver-halide emulsion sensitized with a sensitizing dye selected from the group of dyes characterized by the following formula:

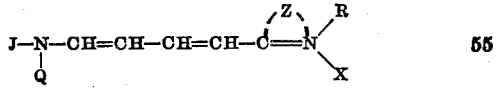

wherein J and Q together represent the non-metallic atoms necessary to complete a six-membered organic basic cyclic nucleus, R represents an alkyl group, X represents an acid radical and Z represents the non-metallic atoms necessary to complete a naphthoxazole nucleus.

10. A photographic gelatino-silver-halide emulsion sensitized with a sensitizing dye selected from the group of dyes characterized by the following formula:

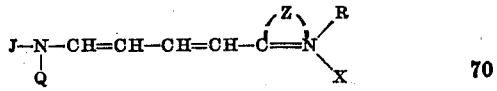

wherein J and Q together represent the non-metallic atoms necessary to complete a piperidyl nucleus, R represents an alkyl group, X represents an acid radical and Z represents the non-metallic atoms necessary to complete an organic heterocyclic nucleus selected from the group consisting of five-membered and six-membered heterocyclic nuclei.

11. A photographic gelatino-silver-halide emulsion sensitized with a sensitizing dye selected from the group of dyes characterized by the following formula:

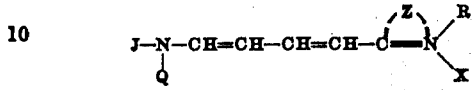

wherein J and Q together represent the non-metallic atoms necessary to complete a piperidyl nucleus, R represents an alkyl group, X represents an acid radical and Z represents the non-metallic atoms necessary to complete an azole nucleus.

12. A photographic gelatino-silver-halide emulsion sensitized with a sensitizing dye selected from the group of dyes characterized by the following formula:

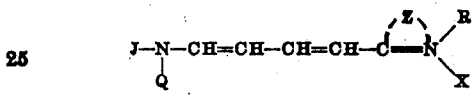

wherein J and Q together represent the non-metallic atoms necessary to complete a piperidyl nucleus, R represents an alkyl group, X represents an acid radical and Z represents the non-metallic atoms necessary to complete a heterocyclic nucleus of the thiazole series.

13. A photographic gelatino-silver-halide emulsion sensitized with a sensitizing dye selected from the group of dyes characterized by the following formula:

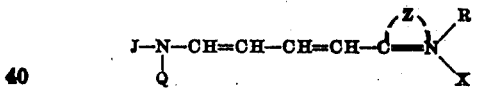

wherein J and Q together represent the non-metallic atoms necessary to complete a piperidyl nucleus, R represents an alkyl group, X represents an acid radical and Z represents the non-metallic atoms necessary to complete a heterocyclic nucleus of the oxazole series.

14. A photographic gelatino-silver halide emulsion sensitized with a sensitizing dye characterized by the following formula:

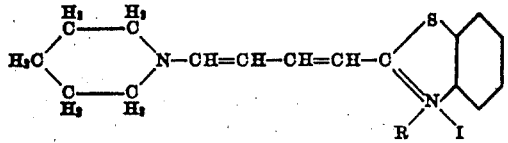

wherein R represents an alkyl group.

15. A photographic gelatino-silver-halide emulsion sensitized with a sensitizing dye characterized by the following formula:

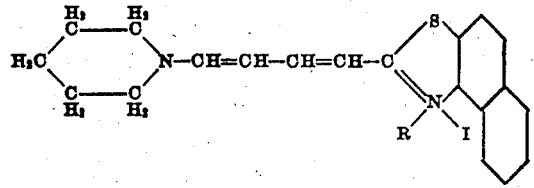

wherein R represents an alkyl group.

16. A photographic gelatino-silver-halide emulsion sensitized with a sensitizing dye characterized by the following formula:

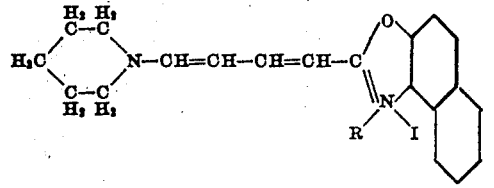

wherein R represents an alkyl group.

17. A photographic gelatino-silver-halide emulsion sensitized with 1-[4-(1-piperidyl)-$\Delta^{1,3}$-butadienyl]-benzothiazole ethiodide.

18. A photographic gelatino-silver-halide emulsion sensitized with 2-[4-(1-piperidyl)-$\Delta^{1,3}$-butadienyl]-$\beta$-naphthothiazole ethiodide.

19. A photographic gelatino-silver-halide emulsion sensitized with 2-[4-(1-piperidyl)-$\Delta^{1,3}$-butadienyl]-$\beta$-naphthoxazole ethiodide.

FRANK L. WHITE.
GRAFTON H. KEYES.